Sept. 8, 1953                    A. GERBER                    2,651,560
                OBSERVING APPARATUS, PARTICULARLY FOR
                OBSERVING OBJECTS MOVING IN SPACE
Filed Dec. 29, 1947                                    3 Sheets-Sheet 1
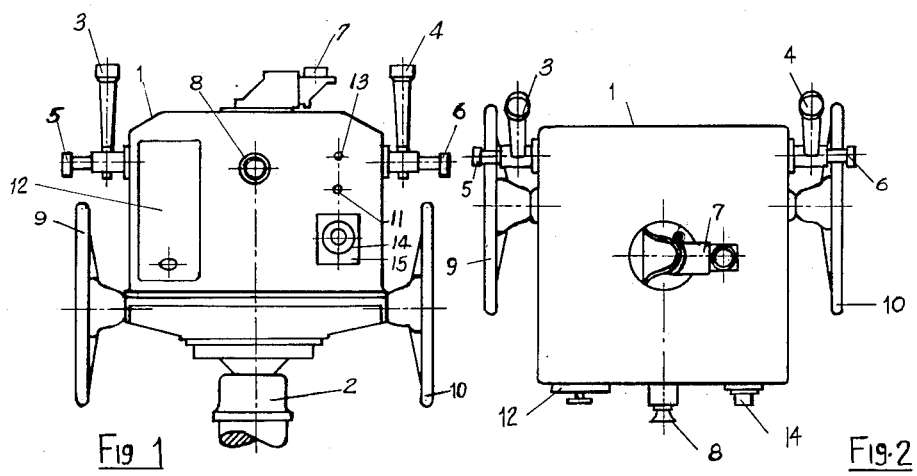
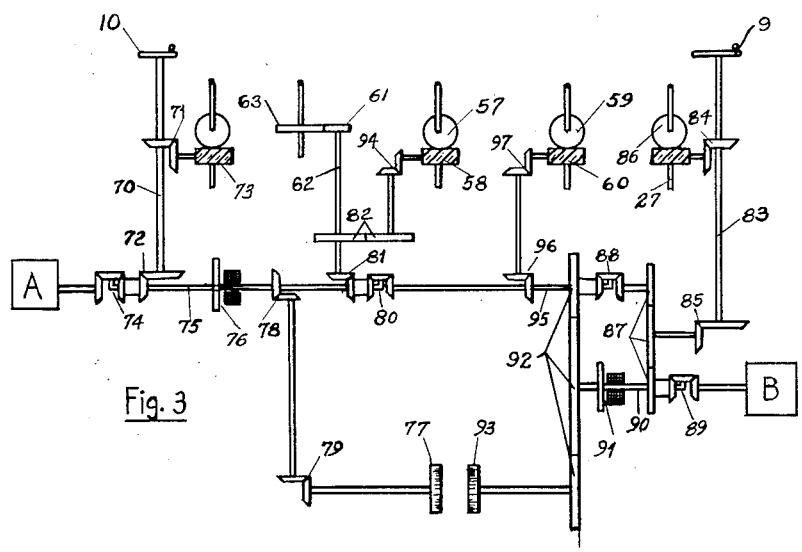
INVENTOR.
ALFRED GERBER
BY
Joseph Hirschman
ATTORNEY Sept. 8, 1953

A. GERBER 2,651,560

OBSERVING APPARATUS, PARTICULARLY FOR
OBSERVING OBJECTS MOVING IN SPACE

Filed Dec. 29, 1947

INVENTOR.
ALFRED GERBER
BY
ATTORNEY

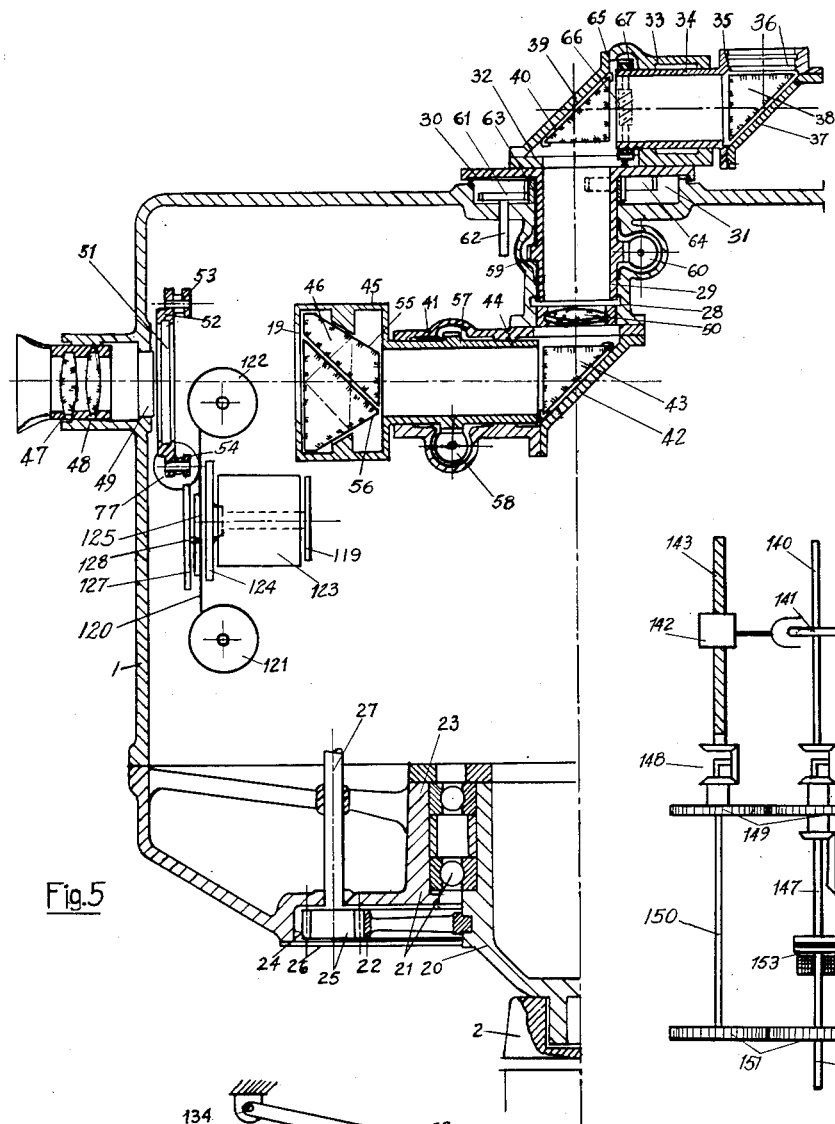

Patented Sept. 8, 1953

2,651,560

UNITED STATES PATENT OFFICE 2,651,560

OBSERVING APPARATUS, PARTICULARLY FOR OBSERVING OBJECTS MOVING IN SPACE

Alfred Gerber, Zurich, Switzerland, assignor to Contraves A. G., Zurich, Switzerland, a company organized under the Swiss laws Application December 29, 1947, Serial No. 794,310
In Switzerland July 5, 1945

Section 1, Public Law 690, August 8, 1946
Patent expires July 5, 1965

6 Claims. (Cl. 346—2)

The task often arises of continuously observing moving objects and determining quantities relating to their motion at certain moments of time, such as distances, speeds and the like. Such tasks occur more especially in the field of military affairs, where it is necessary to determine the course of ships, aircraft or pilot balloons or fix the position of a bursting shell in relation to a moving object. The present invention relates to improvements in observing apparatus intended for such tasks.

Observing apparatus according to the invention is provided with at least one main sighting apparatus and one auxiliary sighting apparatus and control means for the operation of the sighting apparatus; the auxiliary sighting apparatus, together with indicating means for the recording of its momentary position, is in operative connection with the control means, so that, by the operation of an adjusting means, it can be operated and stopped independently of the motion of the main sighting apparatus; for the purpose of further controlling the auxiliary sighting apparatus and its indicating means after the stoppage of the main sighting apparatus there is further provided driving gear including a mechanically movable element which latter during the period of stoppage of the auxiliary sighting apparatus and its indicating means is moved from a position of rest by an amount corresponding to the movement of the main sighting apparatus during this period, the driving connection from the driving gear being connected to the said mechanically movable element during the period of further control so that the said element is again brought into the position of rest by means of such driving connection, and on reaching such position of rest stops the drive from the driving apparatus.

A constructional example of the invention is more particularly described below with the aid of the accompanying drawings.

In the drawings:

Fig. 1 is an elevation of the observing apparatus;

Fig. 2 is a plan of the observing apparatus;

Fig. 3 shows diagrammatically the arrangement of the individual parts of the apparatus;

Fig. 5 is a partial section through the observing apparatus along the line A—A in Fig. 2, in which the telescope 7 is to be considered as having been turned through a right-angle about its vertical axis;

Fig. 6 is a view of the transmission mechanism;

Fig. 7 is a variation of the arrangement shown in Fig. 4; and

Figure 8:
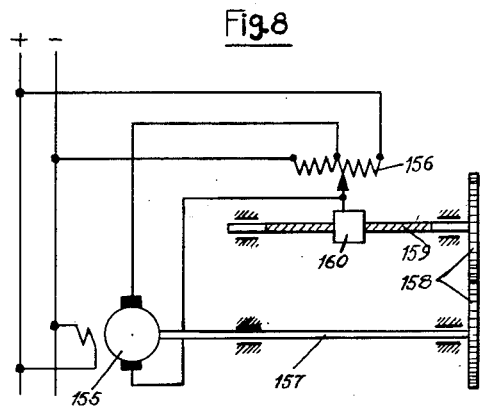
Fig. 8 shows a detail of the arrangement according to Figs. 4 and 7.

The observing apparatus will first be generally described with reference to Figs. 1 and 2.

The cubical housing 1 is turnably arranged on the base or stand 2. On two opposite sides of the housing 1 are arranged the two sighting devices 3, 4 arranged as telescopes and hereafter referred to as the main telescopes, the eyepieces of which are designated 5 and 6. On the top of the housing 1 is arranged the auxiliary telescope 7, the eyepiece 8 of which, in Fig. 1, is on the front of the housing 1. As controls for these three telescopes the two handwheels 9 and 10 are provided of which one (9) controls the rotation of the housing 1 on the base 2 and the other (10) the setting of the sight angles of the three telescopes. If the apparatus is to follow an aircraft flying past, the handwheels 9 and 10 are operated by the two observers using the main telescope in such a way that the two observers always keep the aircraft as closely as possible in the centre of the crossed sighting threads in the eyepieces 5 and 6.

When following an aircraft in this way the optical axis of the auxiliary telescope 7 remains always parallel to the axes of the two main telescopes so that an observer using the eyepiece 8 also keeps the aircraft always in the middle of his eyepiece. This observer, however, by operating a contact device 11 can fix the telescope 7, so that its vertical and horizontal angle no longer changes. Thus it is automatically arranged that two indicators provided to record this angle and which comprise number rollers, are stopped in the position just occupied by them. This position is recorded by means of printed details on a paper strip, which for evaluating the recorded data can be removed from the apparatus by opening the cover 12. For the release of the printed details a further contact device 13 is provided on the housing 1, the operation of which device simultaneously causes, when the printing is completed, the auxiliary telescope 7 to be automatically brought into the position in which its optical axis again coincides with that of the telescopes 3 and 4, and the printing discs also to be brought into the setting corresponding with this position of the telescope.

Assuming that the purpose of the completed observation was merely to ascertain the momentary position of an aircraft, a second measurement has been simultaneously made with the aid of a second observing apparatus and the position can be ascertained by calculation from the vertical and horizontal angles recorded on the paper strips of the two apparatus. For the most part however the problem is to determine, not the distance of an aircraft from a point on the ground, but the distance between the aircraft and a point in space near it, which for example can be imagined as the burst of an exploding shell. For this purpose there is provided inside the auxiliary telescope a mark which is visible in the field of vision of the eyepiece 8 and which can be shifted at will therein by means of a button 14 projecting out of an opening 15 in the housing 1. The position of the mark as will be explained more particularly hereafter with reference to Fig. 1, is also transferred to the printing pen above the paper strip, and by operating the contact device 13 an indication corresponding to the location of the bursting shell relative to the centre of the image is given on the paper strip at the same time as the recording of the horizontal and vertical angles. The distance sought can also be ascertained by simultaneously observing the bursting shell as described with two observing apparatuses situated a distance from one another, recording on the paper strip its position with reference to the aircraft and calculating in known manner the values for horizontal angle, vertical angle and distance of the burst from the centre of the image which result from the two observations.

The arrangement of the two telescopes 3 and 4, which are coupled together and are each turnable about a horizontal axis will be clear from Figs. 1 and 2, so that no further explanation is required. The auxiliary telescope however is constructed in the special manner shown in Fig. 5. As shown in this figure, the whole apparatus rests on a support 20, which is securely screwed into the base 2. The upper part of this support, which projects into the two-part housing 1 carries the inner rings of the two ball bearings 21 and the toothed wheel 22. The lower part of the housing 1 comprises a cylindrical case 23, to which the outer rings of the two ball bearings 21 are secured. The housing 1 is also provided with a cylindrical recess 24 in which are located the gear 22 and the pinion 25 engaging therewith, the recess being closed underneath by a cover 26. The pinion 25 by means of its shaft 27 and further gearing (not shown) is in operative connection with the handwheel 9, so that by operating this handwheel the entire housing is turned about its vertical axis.

The auxiliary telescope 7 in Figs. 1 and 2 is, as is clear from Fig. 5, located on the top of the housing 1, on which is provided a cylindrical bush 28 which is coaxial with the vertical axis of swivelling of the housing and in which the tube 29 is turnably disposed, in the lower end of which tube the object-lens of the auxiliary telescope is held in place by a screwed ring. The tube 29 carries at its upper end a flange 30 which covers the top of a recess 31 formed in the top of the housing 1. On the top of the flange 30 is also secured a part 32, which carries horizontally a cylindrical casing 33, in which is rotatably disposed a tube 34 which at its right-hand end (Fig. 5) has a flange 35, in which the closing disc 36 is positioned. The tube 34 is also closed at its right-hand end by cover 37, which forms an angle of 45° with the axis of the tube 34, and to which the glass prism 38 is attached. In the same way the left-hand end (Fig. 5) of the part 32 is closed by a cover 40 carrying a glass prism 39. To the lower end of the bush 28 a further cylindrical bush 41 is horizontally attached, the right-hand end of which is closed by a cover 42 which makes an angle of 45° with the axis of the bush 41 and to which is fixed a glass prism 43. In the bush 41 the tube 44 is turnably arranged, and carries at its left-hand end (Fig. 5) a frame 45 in which is enclosed a two-part glass prism 46.

The eyepiece of the auxiliary telescope comprises the lens-carrying part 47 which is adjustably carried by male and female threads in a tube 48 projecting from the wall of the housing, and the axis of which coincides with the horizontal axis of the closed box 41. The housing wall is provided with an opening closed by a glass plate 49, and immediately behind this glass plate a glass disc 51 is arranged in the focal plane of the object-lens 50 to serve as a marking plate. Two levers 53, 54 are pivoted at diametrically opposed points to the casing 52 holding the marking plate, which levers form part of the pantograph shown in Fig. 6 and more particularly described hereafter.

The path which a bundle of telecentric light rays falling on the glass disc 36 takes in the auxiliary telescope is as follows (see the dot-and-dash line in Fig. 5):

The group of rays passes through the glass plate 36 and is bent through two successive right angles by the prisms 38 and 39; after passing the lens 50 the rays are again bent through a right angle by the prism 43, pass through the tube 44 and strike the prism 46. After being reflected several times in this the bundle of rays passes through the two glass plates 51 and 49, the eyepiece 47 and reaches the eye of the observer. The prism 46 serves in known manner to prevent the image of an object in view formed in the observer's eye from turning about the axis of the eyepiece if the tube 34 is turned about its horizontal axis or the tube 29 about its vertical axis, or if these two parts are turned simultaneously, when following an object. The prism 46 consists of two parts separated by a fine air-gap 19, the outer surfaces 55, 56 being silvered. A beam of light entering from the tube 44 into the prism 46 is totally reflected at the air-gap 19, falls on the silvered surface 55, from which after passing perpendicularly through the air-gap 19 it falls on the exit surface of the lower prism half which is perpendicular to the ocular axis. Here also total reflection occurs, whereafter the beam falls on the silvered surface 56 of the lower prism half and is thereby directed back towards the air gap 19. After another total reflection at this gap the beam reaches the eyepiece by way of the exit surface of the lower half of the prism. In order to prevent rotation of the picture by means of the prism 46 in the manner described the prism must turn about its longitudinal axis and in fact it must, both on rotation of the tube 34 through an angle λ, and on rotation of the tube 29 through an angle α, turn through the half of each angle. Thus, when the two tubes turn simultaneously about angles λ and α respectively the prism 46 must turn through the angle ½ α+λ).

To effect this turning a toothed ring 57 is formed on the tube 44 which is rigid with the prism 46, the said toothed ring engaging with a worm 58 journalled in the bushing 41. In the same way a toothed ring 59 is formed on the tube 29 engaging with a worm 60 journalled in the bushing 28.

The rotation of the tube 34 about its horizontal axis is effected by operation of the shaft 62 which is journalled in the housing 1 and carries a pinion 61. This pinion, together with a toothed ring 63 and another pinion 64, is accommodated in the recess 31 closed by the cover 30, the toothed ring 63 being arranged free to turn on the tube 29. The pinion 64, which also engages the toothed ring 63 is on a shaft 65, which is journalled on the bushing 33 in a manner not shown in detail and carries the worm 66 which engages a toothed ring 67 mounted on the tube 34.

The arrangement for rotating the two telescopes of the observing apparatus will now be described with reference to Figs. 3 and 4. The two bevel gears 71 and 72 are driven by the handwheel 10 by way of the shaft 70. The gear 71 is connected with the worm wheel gear 73 serving for the rotation of the two main telescopes 3, 4 about their horizontal axis. The differential gear 74 is driven both from the bevel gears 72 and also from the driving gear A, which is shown in detail in Fig. 4 and is more particularly described hereafter. The drive shaft 75 of the differential gear 74 carries the movable part of a stop device 76, the function of which is explained in conjunction with Fig. 4. The shaft 75 also serves to move the printing drum 77 showing the elevation of the auxiliary telescope, the adjusting occurring by way of the bevel gears 78 and 79. The shaft 75 also drives the differential gear 80, which by means of the bevel gear 81 drives the shaft 62 and the spur gear 61, 63 (Fig. 5) and also, by means of the spur gear 82 and the bevel gear 94, drives the worm gear 57, 58 which effects the movement of the prism 46.

The handwheel 9, which has the function of adjusting the telescope of the observing apparatus to an angle α, and is located on the shaft 83, also drives two bevel gears 84 and 85. The gear 84 is connected by the worm gear 86 with the driveshaft 27 (see also Fig. 5) for the rotation of the housing 1 about its vertical axis, while the gear 85 transmits its motion to the double spur gearing 87 and thereby to the two differential gears 88 and 89. The gearing 89 is further connected to a driving apparatus B constructed similarly to the driving apparatus A.

By means of the shaft 90, which also carries the movable part of a stop device 91, the resultant motion arising from the gearing 89 is transmitted to the double spur gearing 92 and drives the differential gear 88 and the printing drum 93 which indicates the vertical angle α of the auxiliary telescope. The differential gear 88, which takes its drive not only indirectly from the handwheel 9 but also from the differential gearing 89, imparts its resultant motion to the shaft 95. The latter is on the one hand connected by means of the bevel gearing 96, 97 with the worm gearing 59, 60, which is for the purpose of rotating the auxiliary telescope about a vertical axis relative to the housing 1, and on the other hand also drives the differential gear 80.

Figure 4:
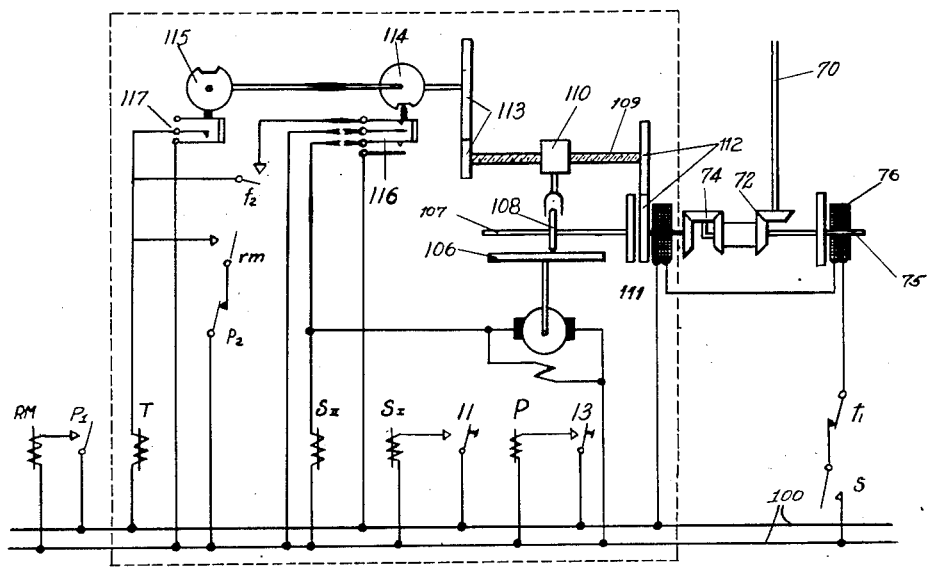
Fig. 4 shows a part of the arrangement according to Fig. 3.

The driving apparatus A (Fig. 3) is shown in Fig. 4 inside a rectangle drawn in chain lines. It comprises a friction gearing which consists of the electric motor 105, the disc 106 driven thereby, friction wheel 108 shiftably but not rotatably disposed on the shaft 107, the screw rod or spindle 109 and the threaded block 110 carried thereon for the purpose of shifting the friction wheel 108. The shaft 107 is connected by means of the electromagnetic coupling 111 with the differential gear 74 (see also Fig. 3), the part of the coupling connected with the said gear forming one wheel of a spur gearing 112, which drives the screw rod or spindle 109. The left-hand end (Fig. 4) of the rod 109 is connected by further spur gearing 113 with a shaft carrying cam discs 114 and 115. For supplying the electric motor 105, the electromagnetic coupling 111, the stop device 76, the relays S, P, T and the printing magnet RM the power circuit 100 is provided. The cam disc 114 is so constructed that it holds open the two contacts of the contact assembly 116, so long as the screw block 110 is at rest, when the friction disc 108 stands over the middle of the disc 106. However, if the screw block 110 is moved out of this position to left or right the cam disc 114 holds the contacts of the contact assembly 116 closed, whereby as will be seen from Fig. 4, the motor is switched into the closed current circuit and begins to run. The cam disc 115 however only closes the contact 117 controlled by it if the screw block 110 is in its left or right hand end position. The driving apparatus B (see Fig. 3) is constructed in the same way as the driving apparatus A shown in Fig. 4, with the difference that the relay P exerts no influence on the printing magnet, since the driving apparatus A and B are always controlled simultaneously by the contact devices 11 and 13.

The driving apparatus in Fig. 4 operates as follows. Before operation of the contact device 11 (see Figs. 1 and 4) the electric motor is stationary, since the screw block is in the position or rest. The circuit of the stop device 76 and the coupling 111 is opened at the contact s of the relay S, so that the shaft 75 is not affected by the stop device 76 and the shaft 107 is connected with the differential gear 74 through the coupling 111. If now the bevelled gearing 72 is driven by the shaft 70, then this motion is directly transmitted to the shaft 75, since when the screw block 110 is stationary the shaft 107 cannot be moved by the differential gear 74.

By operating the contact device 11 the relay S responds by way of its winding $S_1$, and by closing its load contact s completes the circuit through the contact $t_1$ of the relay T, the winding of the stop device 76 and the winding of the coupling 111. The stop device 76 brakes the shaft 75 securely, while the coupling 111 breaks the connection between the shaft 107 and the differential gear 74. The motion of the bevel gearing 72 is therefore no longer transmitted to the shaft 75, but through the spur gearing 112 to the rod 109 and the two cam discs 114 and 115. While the rotation of the cam disc 115 has for the present no effect, the rotation of the cam disc 114 directly causes the closing of the contacts of the contact breaker 116, whereby the circuit of the motor 105 and the winding of holding coil $S_{11}$ of the relay S are closed. This relay remains excited in this state even after opening of the contact device 11, until the screw block 11 has again reached the position of rest.

It will be seen that from the moment when the contact device 11 is operated and onwards the adjusting motion of the shaft 70 is, as it were, stored up in the friction gearing while the amount the screw block 110 is moved to left or right gives a measure of the amount of this adjusting motion. The block 110 moves until either the contact device 13 is operated or until the block reaches its extreme left or right hand position. In the first case, the relay P is connected and by its contact $p_1$ operates the printing magnet RM which remains in operation as long as the contact device 13 is closed. When this is again opened the relay P ceases to function by reason of its load-contact $p_1$ opening and its contact $p_2$ closing, whereupon the armature of the printing magnet RM also returns to its position of rest and thereby opens its load-contact $rm$. In the brief interval between the de-energisation of the relay P and that of the printing magnet RM the circuit of the relay T is completed through the contacts $p_2$ and $rm$, and the said relay T is energised and switches itself into the circuit through its contact $t_2$ and the upper contact of the contact asembly 116. By the opening of the contact $t_1$, the circuit of the coupling 111 and the stop device 76, up to now closed, is interrupted, so that the shaft 75 is again freed and the connection between the shaft 107 and the differential gear 74 is restored. The motion arising from the shaft 70 is now no longer transmitted to the screw rod 109, but there occurs in the shaft 75 secured to the differential gear 74 a motion resulting from the movements arising from the shaft 70 and the shaft 107. By the spur gearing 112 the movement of the shaft 107 is also transferred to the rod 109 and shifts the block 110 in the direction of its position of rest; when this is reached the two contacts of the contact breaker 116 are opened, whereby the circuit of the relay T and also those of the motor 105 and the winding $S_{11}$ are opened. In the second case, where the block reaches its extreme left or right position, the relay T alone is excited through the contact 117, whereupon the same process of motion as previously described occurs.

Without further comment it will be noted from Fig. 4, that in the two cases described the motion of the shaft 107 executed in the period between the excitation of the relay T and the return of the block 110 to its position of rest is exactly the same as the motion transferred from the differential gear 74 to the spur gear 112 when the coupling 111 is opened. By the appropriate choice of ratios for the differentials 72 and 74 the result is obtained that also the motion transferred to the shaft 75 by the driving apparatus of Fig. 4, is the same as the motion arising from the shaft 70 in the time between the operation of the contact device 11 and the excitation of the relay T.

The cooperative functioning of the individual parts of the observing apparatus when applied to the following of an aerial object is as follows, with reference to Fig. 3. The operation of the handwheel 10 intended for adjustment with regard to the angle of elevation λ causes movement of the two main telescopes 3 and 4 (Fig. 1) about their horizontal axis by means of the gearing 71, 73; the movement of that part of the auxiliary telescope 7 which is turnable about a horizontal axis, by means of the gearing 72, 74, 80, 61 and 61, 63; and the movement of the printing drum 77 by means of the gearing 72, 74, 78 and 79. The operation of the handwheel 9 intended for adjustment with regard to the lateral angle α causes the turning of the housing 1 about its vertical axis by means of the gearing 84 and 86; and the movement of the printing drum 93 by means of the gearing 85, 87, 89 and 92 through the differential 89. The driving apparatus B is connected with the stop device 91 for the shaft 90 in the same way as the driving apparatus A is connected with the stop device 76. While the contact device 11 (Figs. 1 and 4) is not operated the driving apparatus remains at rest, so that the drive from the shaft 83 is directly transmitted to the shaft 90 and the spur gearing 92. The differential gear 88 thus receives the same drive from both sides, the transmission ratios of the gearing 87, 88, 89 and 92 being so selected that the shaft 95 remains stationary. Thus there is no rotation of the auxiliary telescope about its vertical axis relative to the housing 1. This telescope thus receives exactly the same movement for elevation and bearing angles as the two main telescopes.

If the contact device 11 is operated for the purpose of stopping the auxiliary telescope, while the observed object is further followed with the two main telescopes by turning the hand wheels 9 and 10, the two driving apparatuses A and B are put into operation in the manner described. So far as the drive for the angle of elevation is concerned the result is that the movement of the hand wheel 10 affects the driving apparatus A, the differential gear 80 ceases to be driven by the shaft 75, and the printing drum stops. Similarly, as regards the drive for the bearing angle, the movement of the handwheel 9 affects the driving apparatus B and stops the printing drum through the braking of the shaft 90. Since the differential 88 ceases to be driven by the spur gearing 92, while the drive from the spur gearing 87 still continues, the movement of the hand wheel 9 is transmitted to the shaft 95 and besides the operation of the differential 80, by means of the gearing 96, 97 and 59, 60, also causes rotation of the auxiliary telescope about the vertical axis of the housing, which rotation is equal in amount to the rotational movement of the housing produced by the hand wheel 9, but is, however, in the opposite direction, the auxiliary telescope consequently remains stationary in space, so far as its bearing is concerned.

As a result of this movement of the auxiliary telescope relative to the housing 1, inasmuch as the shaft 62 would not be driven, the pinion 64 would necessarily have to run over the toothed wheel 63 and an unwanted movement would occur of that part of the auxiliary telescope which is turnable about a horizontal axis. This movement is avoided by the above mentioned drive of the differential 80 through the shaft 95 and thus of the shaft 62, and the auxiliary telescope therefore remains stationary in space with regard to its angle of elevation. Through the gearing 82, 94, and 57, 58 the prism 46 also receives a drive dependent on the bearing movement alone, whereby rotation of the image in the eyepiece of the auxiliary telescope is prevented.

After the observer looking into the eyepiece of the auxiliary telescope has operated the button 14 (Fig. 1) as originally described, he operates the contact device 13, whereby the series of movements described with reference to Fig. 4 completes itself. Since the two stop devices 76 and 91 have again freed the shafts 75 and 90, the auxiliary telescope is once more controlled by the two hand wheels 9 and 10 in the manner already described, the movements arising from the driving apparatuses A and B, however, remaining over in the differentials 74 and 89. The auxiliary telescope receives as regards its elevation angle λ and its bearing angle α, a corresponding adjustment which exactly agrees with the sum of the adjusting movement caused by the hand wheels 9 and 10 in the period between the operation of the contact device 11 and the operation of the contact device 13, and the further adjustment caused by the hand wheels after the operation of the contact device 13; thus this adjustment of the auxiliary telescope for elevation occurs entirely through the shaft 75; while through the shaft 95 only the movement arising from driving apparatus B is transmitted to the auxiliary telescope, the additional adjusting movement produced by the handwheel 9 after the contact device 13 is operated being transmitted to the auxiliary telescope by the rotation of the housing 1 carrying the said telescope with it. After the driving apparatuses A and B have returned to their positions of rest, the auxiliary telescope takes up a position which once more agrees with that of the two main telescopes. As the two printing drums 77 and 93 move in the same way as the parts 29 and 34, these drums, after they have been stopped, are brought to the position in which they show the elevation and bearing of the main and auxiliary telescopes.

The printing mechanism is shown in Figs. 5 and 6 with the omission of the necessary driving means for moving the paper strip. The paper strip runs between two rollers 121 and 122 provided to unroll it over a plate 124 belonging to the printing magnet 123. When the magnet is energised it attracts its armature 119 with the attached plate 124 and thus presses the paper strip against the stationary frame 125 and the two printing rollers 77 and 93. The frame 125 is provided on its four sides with marks 126, diagrammatically indicated in Fig. 6, which produce a corresponding impression on the paper strip 120 and permit determination of the centre of the image after removal of the strip from the observing apparatus. Inside the frame 125 is a pen 128 secured to a lever 127, the pen making a mark on the paper strip when the printing magnet 123 operates. The lever 127 forms one part of a pantograph comprising the levers 127, 129, 130 and 131, of which the lever 130 is turnable about a pivot 132 fixed to the housing, and the lever 131 carries the button 14 projecting through the opening 15 in the housing 1. A second pantograph is constructed from the levers 53, 54, 133 and the frame 52 carrying the glass plate 51. The lever 53 is turnable about the pivot 134 fixed to the housing, and the lever 133 is connected to the button 14. The two pantographs are so constructed that both the mark 135 in the middle of the glass plate 51, and the pen 128 reproduce the movement of the button 14 on a reduced scale. As was originally described, the mechanism, by operating the button 14, allows of the mark 135 being positioned in a desired point of the field of view of the eyepiece and of this point being also impressed upon the paper strip.

By the arrangement of two pantographs it is possible to select a desired transmission ratio both between the movement of the button 14 and that of the mark 135, as well as between the movement of the button 14 and that of the pen 128. The mechanism in certain cases, however, can be constructed with only a single pantograph, for example, when the transmission ratio between the movements of the mark 135 and the pen 128 is 1:1. The frame 52 is in this case so arranged that it is movable in two directions perpendicular to each other, but is not rotatable. The pen 128 can then simply be secured to a lever rigidly disposed on the frame 52, while a pantograph can be provided, as shown in Fig. 6, for the movement of the frame 52 by means of the button 14.

A variation of the driving mechanism shown in Fig. 4, is diagrammatically illustrated in Fig. 7. The mechanism comprises an electric motor 138 and a friction gear driven thereby, the said friction gear consisting of the disc 139, the friction drum 141 movable on the shaft 140 and the threaded rod or spindle 143 carrying the threaded block 142. The shaft 140 conveys its motion to the differential 146 which on the other side is also driven by the shaft 144 by way of the bevel gearing 145, and the drive from which is led to the shaft 147. The screw rod 143 is driven through the differential 148, which receives its drive on the one hand from the shaft 144 through the spur gearing 149 and the bevel gearing 145, and on the other hand from the shaft 150. The latter is connected by the spur gearing 151 to the shaft 152, which in turn can be connected to the shaft 147 by means of the electro-magnetic coupling 153. The coupling 153 is moreover so constructed that when not energised by the current it connects the two shafts 147 and 152 with each other, while upon energization it disconnects the two shafts and in addition securely brakes the shaft 152. The control mechanisms for the driving apparatus are not shown in Fig. 7, as it can be constructed in the same way as the apparatus in Fig. 4. The operation is as follows:

If the shaft 144 which corresponds to the shaft 70 of Fig. 4, is driven when the motor 138 is at a standstill and the friction drum 141 is in the position of rest, this motion is transmitted directly to the shaft 152 through the differential 146 and to the differential 148 through the spur gearing 149. The differential 148 further receives through the spur gearing 151 and the shaft 150 an impulse of such magnitude that the screw rod 143 remains stationary. If the coupling 153 is brought into operation, the differential 148 is driven through the spur gearing 149 as the shaft 150 is stationary, and causes a movement of the rod 143, so that the transmission ratio of the friction gearing is altered. If the circuit of the coupling 153 is again opened, after the motor 138 is switched on, any further movement of the shaft 144 produces no rotation of the rod 143, in consequence of the shafts 147 and 152 being again connected together. The rod 143 receives an impulse which is transmitted by the rotating shaft 140 through the differential 146, the shafts 147, 152, the spur gearing 151 and the shaft 150 to the differential 148, and the screw block 142 moves in the direction of its position of rest. After this is reached the shaft 140 again stops, so that the drive from the shaft 144 is again transmitted to the shaft 152 in the manner hereinbefore described.

The friction gearing in Figs. 4 and 7 can be replaced by the mechanism shown in Fig. 8. In this, a shunt motor 155 is provided, the armature of which is in circuit with a potentiometer through a variable resistance 156. The drive shaft 157 of the motor, which shaft can be regarded as replacing the shaft 107 or 140 in the driving apparatus of Figs. 4 and 7, drives the screw rod 159 through the spur gearing 158 and thus, according to the direction of rotation, shifts in one direction or the other the screw block 160, which carries a sliding contact movable over the resistance 156.

The motor 155 is so connected that, if the screw block 160 moves out of its position of rest, the rod 159 is driven by the motor in such a direction that the screw block 160 is always adjusted towards its position of rest. The functioning of the mechanism in Fig. 8 is thus completely identical with that of the friction gearing in Fig. 4 or 7.

If this mechanism is, for example, to replace the friction gearing of the driving mechanism of Fig. 4, then the spur gearing 158 replaces the spur gearing 112 together with the coupling 111, and the rod 159 is connected to the gearing 113. The electric circuit according to Fig. 4 can now be simplified, since the motor circuit does not need to be dependent on the contact breaker 116. For the sake of safety, to prevent the motion of the driving shaft 70 being partly transferred to the motor shaft 157 before the contact device 11 is operated, it is useful to connect the shaft 157 with the motor shaft through a self-locking worm gear.

Having now particularly described and ascertained the nature of my said invention and in what manner the same is to be performed, I declare that what I claim is:

1. An optical apparatus comprising a sighting device which is rotatable about an axis for adjustment corresponding to a coordinate; a rotatable recording mechanism for recording the position of the sighting device; means for transmitting the rotary movement of the sighting device to the recording mechanism; a source of power constructed for transmitting an additional rotary movement to the recording mechanism; further means for automatically putting the source of power out of action upon correspondence of the positions of the sighting device and recording mechanism; control members having a working and a rest position and constructed to keep, in the working position, both the source of power and the means for transmitting movement out of action and thereby to arrest the recording mechanism on simultaneous further movement of the sighting mechanism, said control members being constructed, on the one hand, to bring the source of power into action on switching from the working to the rest position and thereby to effect a follow-up of the recording mechanism with reference to the sighting mechanism limited by the said further means, and, on the other hand, to bring into action also the means for transmitting movement and thereby additionally to adjust the recording mechanism by the sighting mechanism.

2. An optical apparatus comprising a main sighting device and an auxiliary sighting device rotatably mounted about parallel axes for adjustment corresponding to a coordinate; a rotatable recording mechanism for recording the position of the auxiliary sighting device and operatively connected with the latter; means for transmitting the rotary movement of the main sighting device to the recording mechanism and the auxiliary sighting device; a source of power constructed to transmit a further rotary movement to the recording mechanism and the auxiliary sighting device; additional means for putting the source of power automatically out of action upon correspondence of the position of the main sighting device with the positions of the recording mechanism and of the auxiliary sighting device; control members having a working and a rest position and constructed to keep, in the working position, both the source of power and the means for transmitting movement out of action and thereby to arrest the recording mechanism while the main sighting device simultaneously rotates further and to keep the auxiliary sighting mechanism fixed in space, said control members being constructed further, on the one hand, to bring the source of power into action upon switching from the working to the rest position and thereby to effect a follow-up of the recording mechanism and of the auxiliary sighting device with reference to the main sighting mechanism limited by the said further means, and, on the other hand, to bring into action also the means for transmitting movement and thereby additionally to adjust the recording mechanism and the auxiliary sighting device.

3. An optical apparatus comprising a housing rotatable about an axis; a main sighting device fixed to the housing to rotate therewith; an auxiliary sighting device rotatably fixed on the housing with its axis of rotation parallel to the first-mentioned axes and with its optical axis parallel to the optical axis of the main sighting device in normal position; a recording mechanism rotatably mounted in the housing for recording the position of the auxiliary sighting device; driving connections constructed to adjust the recording mechanism in correspondence with the rotation of the main sighting mechanism; additional driving connections constructed to transmit to the auxiliary sighting device a rotary movement which is of the same magnitude as the rotary movement of the main sighting device, but of opposite direction; a source of power arranged to produce a follow-up movement of the recording mechanism and of the auxiliary sighting device with reference to the main sighting device; control members having a working and a resting position and constructed to actuate in the working position the said driving connections for the auxiliary sighting device and to fix the optical axis of the latter in space, to keep the source of power and the said additional driving connections out of action and thereby arrest the recording mechanism, said control members being constructed further, on shifting into the rest position, to bring the source of power into action on the one hand, and thereby effect a follow-up of the auxiliary sighting device and of the recording mechanism with reference to the main sighting device, and on the other hand to keep the said additional driving connections out of action and thereby keep the auxiliary sighting device in the normal position.

4. An optical apparatus comprising a main sighting device and an auxiliary sighting device rotatable about parallel axes to effect adjustment corresponding to a coordinate; a mark in the field of vision of the auxiliary sighting device and movably arranged in a direction transverse to the optical axis of such device; a recording tape movable in its longitudinal direction; a printing roller rotatably disposed over the tape and operatively connected with the auxiliary sighting device, said roller being provided with a scale for indicating the position of such sighting device; a reference mark and a printing stylus fixed above the tape and each constructed to produce an impression on the tape, the reference mark being fixed in a direction parallel to the surface of the tape, whereas the printing stylus is movable; means movable transversely to the surface of the tape and constructed to effect pressing of the tape upon the printing roller, the printing stylus and the reference mark, a pantograph connected both with the mark in the field of vision of the auxiliary sighting device and with the printing stylus and constructed, upon movement of the mark, transmit such movement to the stylus; driving connections for transmitting the movement of the main sighting device to the printing roller and the auxiliary sighting device; a source of power constructed to transmit an additional rotary movement to the printing roller and the auxiliary sighting device; auxiliary means operative automatically to put the source of power out of action upon correspondence of the position of the main sighting device with the positions of the printing roller and the auxiliary sighting device; control members having a working and a rest position and constructed to keep, in the working position, both the source of power and the said driving connections out of operation and thereby to arrest the printing roller while the main sighting device simultaneously continues to rotate, and to keep the auxiliary sighting device fixed in space, said control members being constructed also, upon changing from the working to the rest position, on the one hand to bring the source of power into action and thereby to effect a follow-up of the printing roller and of the auxiliary sighting device with reference to the main sighting device limited by the said auxiliary means, and on the other hand to bring also the said driving connections into action and thereby additionally to adjust the printing roller and the auxiliary sighting device.

5. A recording apparatus comprising an independently adjustable first part; an adjustable recording device for recording the position of the said first part; driving mechanism; an adjustable control mechanism associated with the driving mechanism and having a rest position and constructed to render the driving mechanism inoperative in its rest position and to maintain the driving mechanism in operation outside of its rest position; motion transmitting means having two different working positions and constructed to transmit, in its first working position, the movement of the said first part to the said control mechanism and to move the same out of its rest position, and in its other working position to transmit to the recording device a movement corresponding to the sum of the movements of the said first part and of the driving mechanism, and simultaneously to return the control mechanism into its rest position through the driving mechanism; and actuating means for selectively switching the motion transmitting means from the one to the other working position in order to interrupt temporarily, in the said first working position, the recording of the position of the said first part by the recording device, and subsequently, in the other working position, to move the recording device into a position corresponding to the momentary position of the said first part.

6. A recording device comprising an independently adjustable first part; an adjustable recording device for recording the position of the said first part; driving mechanism constructed to produce a movement of variable velocity; an adjustable control mechanism for varying the velocity of said movement, and having a rest position and constructed to make the velocity of the said movement zero in said position of rest, and to make such velocity, outside of such rest position, progressively larger the further the control mechanism is removed from its position of rest; motion transmitting means having two different working positions and constructed to transmit, in its first working position, the movement of the said first part to the said control mechanism and to move the latter out of its rest position, and in the other working position to transmit to the recording device a movement corresponding to the sum of the movements of the said first part and of the driving mechanism and simultaneously to return the control mechanism through the driving mechanism into its position of rest; and actuating means for selectively switching the motion transmitting means from the one to the other working position in order to interrupt temporarily, in said first working position, the recording of the position of the said first part by the recording device and subsequently, in the other working position, to move the recording device into a position corresponding to the momentary position of the said first part with diminishing velocity.

ALFRED GERBER.

References Cited in the file of this patent

UNITED STATES PATENTS

| Number | Name | Date |
| --- | --- | --- |
| 838,784 | Imlay | Dec. 18, 1906 |
| 1,432,570 | Roux | Oct. 17, 1922 |
| 1,820,187 | Gaynor | Aug. 25, 1931 |
| 2,174,330 | Papello | Sept. 26, 1939 |
| 2,340,324 | Hobbs | Feb. 1, 1944 |
| 2,349,506 | Lowkrantz et al. | May 23, 1944 |
| 2,385,641 | Peterson | Sept. 25, 1945 |
| 2,472,019 | Kinderman | May 31, 1949 |
| 2,492,745 | Hammes | Dec. 27, 1949 |
| 2,497,216 | Greenough | Feb. 14, 1950 |